United States Patent [19]

Martynowicz

[11] Patent Number: 5,506,276
[45] Date of Patent: Apr. 9, 1996

[54] EXPANDABLE POLYPHENYLENE ETHER AND POLYOLEFIN BLEND AND PROCESS OF MAKING SAME

[75] Inventor: Lynn M. Martynowicz, Virginia Beach, Va.

[73] Assignee: General Electric Company, Pittsfield, Mass.

[21] Appl. No.: 340,092

[22] Filed: Nov. 14, 1994

Related U.S. Application Data

[62] Division of Ser. No. 783,948, Oct. 28, 1991, Pat. No. 5,389,320.

[51] Int. Cl.[6] .................................................. C08J 9/22
[52] U.S. Cl. ........................ 521/60; 521/56; 521/58; 521/59; 521/134; 521/139; 521/140
[58] Field of Search ........................ 521/56, 60, 139, 521/140, 134, 57, 59, 58

[56] References Cited

U.S. PATENT DOCUMENTS

| | | |
|---|---|---|
| 4,280,950 | 7/1981 | Nagata et al. . |
| 4,379,859 | 4/1983 | Hirosawa et al. . |
| 4,383,082 | 5/1983 | Lee, Jr. . |
| 4,399,087 | 8/1983 | Akiyama et al. . |
| 4,443,393 | 4/1984 | Akiyama et al. . |
| 4,504,601 | 3/1985 | Kuwabara et al. . |
| 4,584,334 | 4/1986 | Lee, Jr. et al. . |
| 4,661,302 | 4/1987 | Park . |
| 4,705,811 | 11/1987 | Park . |
| 4,720,509 | 1/1988 | Nakumura . |
| 4,727,093 | 2/1988 | Allen et al. ......................... 521/139 |
| 4,764,559 | 8/1988 | Yamauchi et al. . |
| 4,777,000 | 10/1988 | Kuwabara et al. . |
| 4,782,098 | 11/1988 | Allen et al. . |
| 4,791,145 | 12/1988 | Pressman ............................ 521/139 |
| 4,840,973 | 6/1989 | Kuwabara et al. . |
| 4,861,531 | 8/1989 | Maeda . |
| 4,874,796 | 10/1989 | Allen et al. . |
| 4,889,671 | 12/1989 | Akiyama et al. . |
| 4,920,153 | 4/1990 | Allen et al. . |
| 4,937,271 | 6/1990 | Akamatsu et al. . |
| 4,948,817 | 8/1990 | Kuwabara et al. . |
| 4,972,021 | 11/1990 | Lee, Jr. . |
| 5,008,298 | 4/1991 | Allen et al. . |
| 5,032,620 | 7/1991 | Arai et al. . |
| 5,064,869 | 11/1991 | Bopp et al. . |
| 5,093,375 | 3/1992 | Hahn et al. ......................... 521/139 |
| 5,130,340 | 7/1992 | Allen et al. . |
| 5,147,894 | 9/1992 | Bopp ................................... 521/139 |
| 5,177,052 | 1/1993 | Ambro et al. . |
| 5,189,076 | 2/1993 | Bopp ................................... 521/139 |
| 5,389,320 | 2/1995 | Martynowicz ...................... 521/60 |

FOREIGN PATENT DOCUMENTS

| | | |
|---|---|---|
| 265788 | 5/1988 | European Pat. Off. . |
| 426372A1 | 5/1991 | European Pat. Off. . |
| 165926 | 12/1980 | Japan . |
| WO87/00481 | 7/1985 | WIPO . |

Primary Examiner—Morton Foelak

[57] ABSTRACT

A process for producing expandable particles of a melt compounded blend of polyphenylene ether resin and polyolefin resin. A melt compounded blend of polyphenylene ether resin and polyolefin resin, a blowing agent and water are mixed in a pressure vessel to form a dispersion; the dispersion is heated in the sealed pressure vessel to impregnate the blowing agent in the melt compounded blend of resin particles; the dispersion is then cooled in the sealed pressure vessel; and a cooled blowing agent-impregnated, melt compounded blend of resin particles is removed from the reactor. A preferred blowing agent is Freon® 11. The particles are pre-expanded by heating, and the pre-expanded particles can be foamed in a conventional mold when heat is applied thereto. A resin molding composition comprising a melt compounded blend of heat-pre-expanded, low density, resilient polyphenylene ether resin and polyolefin resin particles having about 95.0 weight percent to about 5.0 weight percent polyphenylene ether resin based on the total weight of the polyphenylene ether resin and polyolefin resin, is obtained by the above process.

6 Claims, No Drawings

EXPANDABLE POLYPHENYLENE ETHER AND POLYOLEFIN BLEND AND PROCESS OF MAKING SAME

This is a divisional of co-pending application Ser. No. 07/783,948 filed on Oct. 28 1991, now U.S. Pat. No. 5,389,320.

This invention relates to pre-expanded particles of polyphenylene ether resin and polyolefin resin and a process for the production thereof.

BACKGROUND OF THE INVENTION

Polyphenylene ether resins are known as high performance engineering thermoplastics possessing high melt viscosities and softening points which makes them useful for many applications where resistance to high temperatures is desired, and it is well known that properties of the polyphenylene ether resins can be altered materially by blending with other resin materials.

As described in U.S. Pat. No. 4,972,021, blends of polyphenylene ethers and polyolefins are of great interest because they can bring some of the chemical resistance of the polyolefins to the polyphenylene ether. Specific blends of polyphenylene ether resins and polypropylene resin are disclosed therein. Other non-foamed blends or combinations of polyolefin resins with polyphenylene ether resins are described in U.S. Pat. Nos. 4,383,082, 4,584,334 and 4,764,559.

It is known in the prior art to form foams from blends of polyphenylene ether resin and polystyrene resin or high impact polystyrene, i.e., rubber-modified grafted polystyrene, imbibed with volatile blowing agent such as chlorinated hydrocarbons, which ultimately result in pre-expanded particles of the polyphenylene ether resin and polystyrene. For example, in U.S. Pat. No. 4,782,098, a shaped polymer foam structure is obtained by imbibing particles of an interpolymer of a polyphenylene ether resin and a polymerized vinyl aromatic monomer under pressure with an easily volatilizable hydrocarbon or halogenated hydrocarbon blowing agent; heating the imbibed particles to a temperature sufficient to cause expansion of said particles to a density significantly less than that of the imbibed particles; and filling a mold with the expanded particles and subjecting the particles to sufficient heat to fuse the particles together on cooling to form a shaped coherent foam structure.

Foamed polyolefins are also known in the prior art. In U.S. Pat. No. 4,379,859, pre-foamed particles of polypropylene resin are produced by dispersing substantially non-crosslinked polypropylene resin particles composed of an ethylene/propylene random copolymer or a mixture of an ethylene/propylene random copolymer and low-density polyethylene and/or an ethylene/vinyl acetate copolymer as a base resin and a volatile blowing agent in water in the presence of a dispersing agent within a closed vessel; heating them to a temperature above a point at which the particles soften, thereby to impregnate the blowing agent in the particles; and while maintaining the pressure of the inside of the vessel higher than the vapor pressure of the blowing agent, opening one end of the vessel to release the particles and water simultaneously into an atmosphere kept at a lower pressure than the inside of the vessel. Other pre-foamed particles of polyolefin resins and the method of their manufacture are described in U.S. Pat. Nos. 4,399,087, 4,443,393, 4,504,601 and 4,720,509.

For certain applications, it is desirable to form foamed resin articles from the blends of polyphenylene ether resins and polyolefin resins in order to obtain foamed articles having the improved properties found in the non-foamed prior art articles. For instance, it would be desirable to provide foamed automotive parts, for example, automobile bumpers, having the combined properties of polyphenylene ether resin and polyolefin resins. Although expandable, pre-expanded and foamed polyolefin resins or blends of polyphenylene ether resin and polystyrene resins are well-known in the art as described above, the known art does not provide expandable, pre-expanded and foamed resins of polyphenylene ether resin combined with polyolefin resins or a method of making them.

SUMMARY OF THE INVENTION

According to the present invention, there are provided expandable, pre-expanded and foamed thermoplastic molding compositions of polyphenylene ether resin and polyolefin resin. Expandable particles of melt compounded blends of expandable polyphenylene ether resin and polyolefin resin are heat expanded to form a resin molding composition comprising a melt compounded blend of heat-pre-expanded, low density, resilient polyphenylene ether resin and polyolefin resin particles having about 95.0 weight percent to about 5.0 weight percent polyphenylene ether resin based on the total weight of the polyphenylene ether resin and polyolefin resin.

In accordance with the present invention, there is also provided a process for producing expanded particles of melt compounded blend of polyphenylene ether resin and polyolefin resin, comprising, mixing a melt compounded blend of polyphenylene ether resin and polyolefin resin, a blowing agent and water in a sealed pressure reactor to form a dispersion; heating the dispersion in the sealed pressure reactor for a sufficient time to impregnate the blowing agent in the melt compounded blend of resin particles while continuously maintaining the dispersion in the sealed pressure reactor; cooling the dispersion in the sealed pressure reactor; and removing the cooled blowing agent-impregnated, melt compounded blend of resin particles from the reactor. To produce a pre-expanded, melt compounded blend of polyphenylene ether resin and polyolefin resin particles, the blowing agent-impregnated, melt compounded blend of resin particles is heated to pre-expand the resin particles and thereby form a pre-expanded, melt compounded blend of polyphenylene ether resin and polyolefin resin particles. To produce a molded article of a foamed melt compounded blend of polyphenylene ether resin and polyolefin resin, a mold is filled with the pre-expanded, melt compounded blend of polyphenylene ether resin and polyolefin resin particles, and the mold is heated to form a molded article of foamed polyphenylene ether resin and polyolefin resin.

DETAILED DESCRIPTION OF THE INVENTION

The polyphenylene ether resins useful in the present compositions and process are individually well known and readily available. The preferred polyphenylene ethers are homo- and co-polymers of the formula:

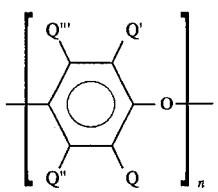

wherein Q, Q', Q" and Q'", are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q'" in addition may be halogen with the proviso that Q and Q' are preferably free of a tertiary carbon atom; and n represents the total number of monomer residues and is an integer of at least 50.

The polyphenylene ether resins can be prepared in accordance with known procedures, such as those described in Hay, U.S. Pat. Nos. 3,306,874 and 3,306,875; and Stamatoff, U.S. Pat. Nos. 3,257,357 and 3,257,358; from the reaction of phenols including but not limited to 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6-methoxyphenol; 2,3,6-trimethylphenol; 2,3,5,6-tetramethylphenol; and 2,6-diethyoxyphenol. Each of these may be reacted alone to produce the corresponding homopolymer, or in pairs or with still other phenols to produce the corresponding copolymer as well known in the art.

For the purposes of the present invention, an especially preferred family of polyphenylene ethers includes those having alkyl substitution in the two positions ortho to the oxygen ether atom, i.e., those of the above formula wherein Q and Q' are alkyl, most preferably having 1 to 4 carbon atoms. Illustrative members of this class are: poly(2,6-dimethyl-1,4-phenylene) ether; poly (2,6-diethyl-1, 4-phenylene) ether; poly (2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene) ether; and the like.

The most preferred polyphenylene ether resin for purposes of the present invention is poly(2,6-dimethyl-1,4phenylene)ether.

Any polyolefin or mixture of polyolefins may be used in the melt compounded blends of the present invention. The polyolefin is usually polyethylene, polypropylene, polyisobutylene, copolymers of ethylene and propylene, as well as copolymers of ethylene and organic esters such as ethylene vinyl acetate, ethylene ethyl acrylate, ethylene methyl acrylate, etc. These are commercially available or are otherwise prepared from known teachings. The polyolefins can be crosslinked, substantially non-crosslinked or non-crosslinked, and high density or low density as well known in the art.

The polyphenylene ethers and polyolefins may be used in the blend alone or in combination with at least one compatibilizer which promotes the homogeneous melt blending of the polyphenylene ether with the polyolefin as described in U.S. Pat. No. 4,383,082. Elastomeric triblock copolymers as described in U.S. Pat. No. 4,166,055 may also be used as compatibilizers in the process and compositions of the present invention.

By way of illustration, the compatibilizer can be an alkenyl aromatic polymer, such as styrene, bromostyrene, chlorostyrene, a-methyl-styrene, para-methyl styrene, vinylxylene, divinylbenzene, vinyl naphthalene and vinyltoluene. Other compatibilizers include natural or synthetic rubber, for example, polybutadiene, polyisoprene, EPDM rubber or silicone rubber; or they can be copolymers or terpolymers of styrene or other alkenyl aromatic compound with an elastomeric or another material, such as block copolymers of styrene and butadiene (for example, AB, ABA, ABAB or ABABA type), including hydrogenated forms of the foregoing; a radial teleblock copolymer of styrene, butadiene and a coupling agent, including hydrogenated forms; terpolymers of acrylonitrile, styrene and butadiene (ABS); styrene-acrylonitrile copolymers (SAN); and a copolymer of styrene and maleic anhydride (SMA); or it can also be an alkenyl aromatic copolymer or terpolymer which has been modified with rubber, for example rubber-modified styrene-maleic anhydride copolymer. Many of these are described in the patent literature, including U.S. Pat. No. 3,383,435.

The compatibilizer or mixture of compatibilizers can be admixed with or inter-reacted with the polyphenylene ether, the polyolefin or the blend of polyphenylene ether resin and polyolefin resin.

When the compatibilizer is present, the polyphenylene ether resin and compatibilizer can be present in widely ranging proportions, but normally are present in weight amounts of from about 4:1 to 1:2 of polyphenylene ether: compatibilizer, e.g., diblock copolymer or radial teleblock copolymer.

The polyphenylene ether (PPE) and polyolefin (PO) resins, and optionally, compatibilizer, may be combined in any conventional manner. Polyphenylene ether resin will typically be in powder or pellet form and the polystryene will typically be in pellet form. The resins may be combined by dry blending in a blender which provides a relatively uniform mixture of the resins. This mixture is typically directed to a thermoplastic extruder, usually of the single or twin screw type, where, in the case of a blend, the resin is compounded with sufficient temperature and shear to provide an intimate PPE/PO blend, referred to herein as a melt compounded blend.

The product of the conventional extruder is an extrudate in the form of strands which may be quenched with cooling water. The cooled strands are then conveniently directed to a comminuting device, typically a high speed chopper or an impeller, which provides the PPE/PO resin in particulate form for use in the present invention. Preferably the pelletizing device provides granules or micropellets consisting of cylindrical particles having an average diameter of less than about 0.02 inch. In preferred embodiments the micropellets possess a length to diameter ratio of about 1:1. Other conventional melt compounders, multi-strand microdies or multi-fiber spinnerettes may be used to plasticate the resin blends of the present invention.

For the present invention, the polyphenylene ether and polyolefin resins are combinable in proportions between from about 5 to about 95 percent and preferably from about 20 to about 80 percent by weight PPE and from about 95 to about 5 percent and preferably from about 80 to about 20 percent by weight PO based upon the weight of the two resins taken together. In accordance with the present invention compositions containing less than about 5 weight percent PPE are considered to be primarily polyolefin (PO) compositions and do not generally exhibit the preferred property improvements associated with PPE/PO blends used to prepare expandable particles in accordance with the present invention. The addition of PPE to PO resin offers improvements in impact strength, resilience, flammability ratings, tensile strength and other mechanical properties. After the particles, e.g., micropellets, of melt compounded blend of polyphenylene ether resin and polyolefin resin and optionally, compatibilizer, are prepared, the particles, e.g., micropellets, are then impregnated with a blowing agent. Preferably the blowing agent comprises a volatile liquid or gas capable of being absorbed by the thermoplastic resin and vaporizes or remains as a vapor at or below the glass transition temperature of the thermoplastic resin.

In accordance with the present invention, only those blowing agents which are capable of being imbibed by the polyphenylene ether and polyolefin resin blend can be used in the specified process. If the blowing agent does not penetrate the particles of the resin blend and become absorbed within the particles of the resin blend when the particles are heated in the form of a dispersion in a sealed pressure reactor, it cannot be used in the process of the present invention. A sufficient amount of blowing agent penetrates and becomes impregnated or imbibed in resin particles, if at the end of the process, after the cooled blowing agent-impregnated melt compounded blend of resin particles is removed from the reactor, the blend pre-expands upon heating. This is easily determined by empirical means, i.e., carrying out the process of the present invention and examining the particles of resin blend after the pre-expansion step. Alternatively, an analysis of the residual liquid removed from the reactor after cooling will show if any of the blowing agent has been absorbed by or impregnated in the particles of PPE/PO resin blend. This analysis is discussed in more detail below. If the concentration of blowing agent remaining in the liquid after the particles of resin blend are heated therein in the presence of the blowing agent, is the same as or substantially the same as the initial concentration of blowing agent prior to heating, then either the blowing agent is one which does not impregnate the particles of the blend and cannot be used in accordance with the present invention or the reaction conditions in the reactor are insufficient to cause absorption of the blowing agent.

The blowing agents include conventional halogenated hydrocarbons, e.g., fluorocarbon blowing agents. The preferred hydrocarbon blowing agents are fluorocarbon blowing agents and include trichlorofluoromethane ($CCl_3F$), dichlorodifluoromethane ($CClF_2$—$CClF_2$) and dichlorotetrafluoroethane ($CClF_2$—$CClF_2$). These are commercially available as FREON®11, FREON®12 and FREON®114. Other halogenated hydrocarbon blowing agents include methylene chloride, chloroform, carbon tetrachloride ($CCl_4$), HCFC's, such as difluorochloromethane ($CHClF_2$), (HCFC-22), (FORCMACEL®S), dichlorotrifluoroethane ($CHCl_2CF_3$), (HCFC-123), dichlorotrifluoroethane (CHF-$ClCClF_2$), (HCFC-123A), chlorotetrafluoroethane ($CHClFCF_3$), (HCFC-124), tetrafluoroethane ($CH_2FCF_3$), (HFC-134A), dichlorofluoroethane ($CCl_2FCH_3$), (HCFC-141B), chlorodifluoroethane ($CH_3CClF_2$), (HCFC-142B), difluoroethane ($CH_3CHF_2$), (HFC-152A) and the like.

To impregnate or imbibe the particles, e.g., micropellets, of melt compounded blend of PPE resin and polylefin (PO) resin with blowing agent, the particles are placed in a pressure vessel along with the blowing agent, water and any other conventional additives, e.g. a dispersing agent, as discussed in more detail below and agitated or mixed to form a dispersion. Generally the mixing is achieved by suitable stirring means in the pressure vessel. The pressure vessel is sealed and slowly heated to a temperature at, or preferably slightly above, the softening temperature of the melt compounded blend of PPE/PO, while continuously agitating to maintain the dispersion in the vessel. Heating is maintained at or above the softening temperature of the blend until the desired amount of blowing agent has impregnated the softened particles of melt compounded blends while continuously agitating to maintain the dispersion. Usually the temperature is maintained at about 120° C. to about 170° C. depending on the particular resin blend. The temperature must be maintained at the softening temperature or above. However, too high a temperature will result in fusion of the particles, thus the temperature must be maintained below the fusion temperature of the particles. Basically, the temperature and time are determined by the Tg of the composition and the rate at which the blowing agent is absorbed by the particles.

Once the desired amount of blowing agent has been impregnated, the dispersion containing the blowing agent-impregnated particles is cooled in the sealed pressure reactor or vessel, and the cooled blowing agent-impregnated, melt compounded blend of resin particles, representing the expandable particles of melt compounded blend of PPE resin and PO resin, is removed from the vessel after pressure release. Agitation of the heat-softened particles is maintained in the vessel until the particles have sufficiently cooled in the vessel to prevent clumping or agglomeration thereof.

The cooling of the dispersion containing the blowing agent-impregnated particles while the dispersion is still sealed in the pressure vessel, prevents premature expansion of the particles when the pressure is released and promotes the retention of the blowing agent in the expandable particle so that there is a greater volume of blowing agent in the particle to cause expansion of the particle when heat is applied thereto to form a pre-expanded particle. Cooling means may be used to assist the lowering of the temperature of the dispersion or cooling may be achieved by using the temperature of the ambient air to cool the pressure vessel. For example, the pressure vessel can be subjected to an ice/water bath or the circulation of ice water in a jacket surrounding the pressure vessel to rapidly cool the dispersion. Any means which lowers the temperature of the dispersion may be used to cool the dispersion.

In the above process the dispersion is allowed to age at or above the softening temperature of the PPE/PO blend for a time sufficient to impregnate the blowing agent in the melt compounded blend of resin particles. The amount of time required for impregnation of the blowing agent is determined empirically and varies according to the particular blowing agent; the proportions of PPE and PO, and optionally, compatibilizer, in the blend; the temperature at which the blend is maintained in its softened state; and the like. The expandable blend must be heat expanded by conventional methods for a pre-expanded particle to determine how much of the particle has expanded. If there is inadequate expansion, for example, if a solid core remains upon heat expansion of the expandable particle, then additional time is required for aging the softened blend in blowing agent in the pressure vessel, or alternatively, the blowing agent is one which cannot be used in accordance with the process of the present invention because its does not impregnate or become imbibed within the particles PPE/PO resin blend.

The amount of the blowing agent varies depending upon the particular blowing agent and the desired degree of expansion. Blowing agent is usually about 10 to 40 parts by weight per 100 parts by weight of the resin being impregnated. There must be a sufficient amount of blowing agent added to the pressure vessel to achieve the desired degree of expansion of the particles. If there is insufficient blowing agent, a solid core remains upon heat expansion of the expandable particle. A thermogravimetric, chromatographic or other analysis for blowing agent in residual liquid removed from the pressure vessel after cooling and removal of the cooled blowing agent-impregnated, melt compounded blend, will show empirically if all of the blowing agent has been utilized (imbibed), and if the expansion of the expandable particle is incomplete as evidenced by the solid core of the particles, then additional blowing agent must be added to the pressure vessel and heated in the dispersion formed therein if the analysis shows that the concentration of the blowing agent has been depleted. If the concentration of blowing agent has not been depleted, as discussed above, it is an alternative indication that the blowing agent is one which does not impregnate the particles of PPE/PO resin blend used in the present invention.

The dispersing agent, if any, used in the dispersion may, for example, be any conventional agent, including, for example, polyvinyl alcohol, basic magnesium carbonate, basic zinc carbonate, calcium carbonate, and the like. Polyvinyl alcohol is most suitable. The amount of the dispersing agent is usually about 0.1 to 10 parts by weight per 100 parts by weight of the resin.

The amount of water mixed with the polyphenylene ether resin and polyolefin resin in the pressure reactor is not critical as long as there is a sufficient amount to form a dispersion of the contents of the reactor or pressure vessel. Thus, there must be a sufficient amount of water to suspend or disperse the melt compounded blend of PPE resin/PO resin, blowing agent and any other agents mixed in the pressure vessel, as well-known in the art.

The cooled blowing agent-impregnated, melt compounded blend of PPE resin/PO resin removed from the reactor is substantially cylindrical expandable microparticles, commonly referred to as beads. The action of the agitation and the temperature used to maintain the resin particles in a softened state in the pressure vessel while maintaining the dispersion, results in the formation of the substantially cylindrical resin particles or beads.

When the cooled blowing agent-impregnated, melt compounded blend of resin particles is removed from the reactor, the particles have not yet been expanded. In order to expand the particles, the particles are heated at a sufficient temperature to pre-expand the particles. For example, the particles can be pre-expanded in hot air at a temperature of about 50° to about 100° C., depending upon the particular PPE resin/PO resin blend. The pre-expanded beads or particles prepared in accordance with the present invention were highly resilient, when compared with the resilience of pure polyphenylene ether resin expanded beads which demonstrated poor resiliency.

When the pre-expanded, melt compounded blend of polyphenylene ether resin and polyolefin resin particles is placed in a mold and heated therein, the blend foams and forms a molded article of foamed polyphenylene ether resin and polyolefin resin which conforms to the shape of the mold. Conventional molds and temperatures may be used to foam the pre-expanded, melt compounded blend of PPE resin/PO resin particles of the present invention. The blends of the present invention may be used to make many articles normally made with expandable resins, e.g., automotive parts such as automobile bumpers, insulating sheets and the like.

In preferred embodiments of the present invention, expandable particles of a melt compounded blend of polyphenylene ether resin and polypropylene resin are made in accordance with the present invention.

The following specific examples illustrate the present invention. However, the examples are not to be construed to limit the claims in any manner whatsoever.

EXAMPLES

Example 1:

A 50/50 percent by weight blend of polyphenylene ether resin having intrinsic viscosities ranging from about 0.10 dl/gm to about 0.70 dl/gm, and polypropylene are formed into micropellets by feeding the blended mixture into an extruder equipped with a multiple strand microdie. Multiple strands having a diameter of less than 0.02 inch are cooled in a water bath and fed to a high speed chopper to produce micropellets having a length to diameter ratio of about 1:1.

Fifty grams of the PPE/polypropylene micropellets, prepared as above, were placed in a pressure vessel with about 16 grams of Freon®11 blowing agent, 60 grams of polyvinyl alcohol and 160 grams of water. Freon®11 blowing agent is trichlorofluoromethane. The vessel was sealed and heated at about 95° C. for 1 hour and then at about 140° C. with continuous agitation (stirring). The temperature was maintained at about 140° C. for 5 hours. The vessel was cooled to room temperature, and the particles in the form of pellets were collected. The pellets were pre-expanded into beads in hot air and examined. The beads of polyphenylene ether and polypropylene were highly resilient as compared with polyphenylene ether heat-expanded beads which demonstrated very little resilience.

Example 2:

Using conditions and a reactor similar to that described in Example 1, 20.0 grams of a PPE/polypropylene blend (50/50) was mixed with 15.0 grams of Freon®11, 6.0 grams of polyvinyl alcohol dispersing agent and 160.0 grams of water and was heated with continuous stirring in the reactor at 95° C. for 1 hour and 140° C. for 5 hours. The reactor was cooled, and the beads removed from the reactor were pre-expanded in hot air. The pre-expanded beads appeared highly resilient.

Example 3:

Fifty (50.0) grams of the same 50/50 PPE/PP resin blend as in Example 1 were placed in a 300 ml. Parr Reactor with 160.0 grams of water, 6.0 grams of polyvinyl alcohol and 16.0 grams of Freon®11. Heating with continuous stirring was continued at 95° C. for 1 hour and at 140° C. for 5 hours. The reactor was cooled, and the product was removed from the reactor. The product was in the form of pellets which, when placed in a heated oven immediately after removal from the reactor, puffed (expanded), thereby forming a pre-expanded PPE/PP.

The above mentioned patents cited throughout the specification are incorporated by reference herein in their entirety.

Other ingredients can also be included in the compositions, these can be selected from among additives commonly employed with plastics, such as fillers and/or reinforcements, plasticizers, colorants, dyes, flame retardants, antioxidants, pigments, mold release agents, dispersing agents, cycle time-reducing agents, processing aids and the like. The agents can be blended with the polyphenylene ether resin and polyolefin resin when they are being blended prior to melt compounding and prior to the formation of the extrudate, or they can be mixed with the melt compounded blend of polyphenylene ether resin and polyolefin resin, blowing agent and water in the pressure vessel in the process for producing expandable particles of melt compounded blend of polyphenylene ether resin and polyolefin resin.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. A resin molding composition comprising a melt compounded blend of heat-pre-expanded, low density, resilient polyphenylene ether resin and homopolyolefin resin particles having about 95.0 weight percent to about 5.0 weight percent polyphenylene ether resin based on the total weight of the polyphenylene ether resin and polyolefin resin.

2. The resin of claim 1 wherein the homopolyolefin is polypropylene.

3. The resin of claim 1 wherein the homopolyolefin is polyethylene.

4. The resin of claim 1, wherein said blend of polyphenylene ether resin and homopolyolefin resin further comprises a compatibilizing polymer.

5. The resin of claim 1, wherein said blend of polyphenylene ether resin and homopolyolefin resin further comprises a resin derived from a vinyl aromatic monomer or a vinyl monomer.

6. The resin of claim 1, wherein said blend of polyphenylene ether resin and homopolyolefin resin further comprises a resin selected from styrene, alpha-methylstyrene, ethylstyrene, chlorostyrene, bromostyrene, vinyltoluene, vinylbenzene, isopropylxylene, acrylonitrile, methyl methacrylate, methyl acrylate, butadiene or mixtures of any of the foregoing.

* * * * *